United States Patent [19]

Maner

[11] Patent Number: 5,242,490
[45] Date of Patent: Sep. 7, 1993

[54] SURFACE REACTIVE VENEER FINISHING COMPOSITION AND METHOD

[75] Inventor: James W. Maner, Jamestown, N.C.

[73] Assignee: Lilly Industries, Inc., Indianapolis, Ind.

[21] Appl. No.: 722,936

[22] Filed: Jun. 28, 1991

[51] Int. Cl.$^5$ .............. C08L 1/18; C08L 75/06; C08L 75/08

[52] U.S. Cl. .................. 106/195; 106/190; 106/200; 106/203; 106/311; 106/499; 106/500; 106/504; 106/505; 427/303; 427/393; 527/301; 528/58; 528/67; 536/35

[58] Field of Search ............ 427/303, 393; 106/499, 106/500, 504, 505, 190, 311, 195, 200, 203; 536/35; 528/58, 67; 527/301

[56] References Cited

U.S. PATENT DOCUMENTS

| | | | |
|---|---|---|---|
| 3,401,143 | 9/1968 | Finelli et al. | 106/195 |
| 4,861,629 | 8/1989 | Nahm | 427/393 |
| 4,891,248 | 1/1990 | Kraus | 106/190 |
| 4,944,803 | 7/1990 | Kraus | 106/195 |

FOREIGN PATENT DOCUMENTS

| | | |
|---|---|---|
| 49-086502 | 8/1974 | Japan . |
| 51-091301 | 8/1976 | Japan . |
| 54-038161 | 11/1979 | Japan . |
| 80-020841 | 6/1980 | Japan . |
| 57-059753 | 4/1982 | Japan . |
| 57-087364 | 5/1982 | Japan . |
| 84-010911 | 3/1984 | Japan . |
| 60-052304 | 3/1985 | Japan . |
| 60-061205 | 4/1985 | Japan . |
| 60-096404 | 5/1985 | Japan . |
| 60-260303 | 12/1985 | Japan . |
| 62-259802 | 11/1987 | Japan . |

OTHER PUBLICATIONS

"The Cracking of Finishes on Birch Plywood Materials", A. J. Sparkes *J. Oil Col. Chem. Assoc.*, 1979, vol. 62, pp. 55-58.

Primary Examiner—Mark L. Bell
Assistant Examiner—Scott L. Hertzog
Attorney, Agent, or Firm—Barnes & Thornburg

[57] ABSTRACT

Veneer surface reactive polyisocyanates can be used in combination with polyhydroxy functional polymers, preferably nitrocellulose, and isocyanate reaction catalyzing organo tin compounds in low solids film-forming formulations as a substitute for standard wash coat and-/or sealer coat compositions in furniture finishing schedules to provide veneer finishes with markedly enhanced resistance to checking.

28 Claims, No Drawings

SURFACE REACTIVE VENEER FINISHING COMPOSITION AND METHOD

FIELD OF INVENTION

This invention relates to wood finishing. More particularly, this invention is directed to a surface reactive coating composition and method of using same in an improved finishing system for wood veneers. The composition and method finds principal application in the furniture manufacturing industry.

BACKGROUND AND SUMMARY OF THE INVENTION

Veneering is one of the oldest woodworking arts, one that has been practiced for centuries. It is an economical way of covering a large area with expensive wood. Through the use of modern techniques, wood veneer panels are used extensively in the furniture making industry.

One problem which has plagued the veneering art not only in centuries past, but also in present day furniture manufacture is the checking of veneer panels, that is, the formation and propagation of cracks along the wood grain as veneer panels age. Veneer is nothing more than extremely thin wood, wood that is typically very much different in terms of porosity and density than the substrate to which it is laminated. Thus thin veneer surfaces are not only subjected to the stresses imposed during typical high pressure and high temperature laminating processes, but they are subjected to the internal stresses resulting from differential response of the substrate and the veneer overlay to environmental changes such as temperature and humidity. With time the thin veneer can yield to those internal stresses by forming checks or cracks, typically along with the veneer grain which propagate as the internal stress is relieved.

There has been a significant effort in the industry to define veneer cutting, laminating, processing and finishing techniques which improve veneer resistance to checking. Thus, it is generally known that sanding veneered surfaces helps to reduce checking by reducing internal stresses. It has also been reported in the literature that nitrocellulose and melamine based veneer finishes tend to be more brittle and consequently more likely to crack than, for example, polyester or polyurethane base finishes. Most U.S. furniture manufacturers use polyester based finish formulations for veneer surfaces. Polyurethane coatings do not find widespread use in the furniture industry because of several negative factors including, but not necessarily limited to, cost, ease of use and ease of repair.

In spite of the many recent developments in coating technology there exists a significant need, especially in the furniture finishing industry, for development of improved composition and methods for providing check resistant veneer finishes of consistent quality.

Accordingly, one object of this invention is to provide an improved veneer finishing process particularly adapted for commercial furniture manufacture.

Another object of the invention is to provide a surface reactive, nitrocellulose-modified urethane-based wood finishing composition.

A further object of this invention is to provide a veneer finishing system which provides enhanced resistance to veneer checking.

Those and other objects are accomplished in accordance with this invention by substituting a surface reactive, urethane-based finishing composition for standard wash coat and/or sealer coat formulations in commercial finishing schedules to provide finished veneer surfaces which exhibit markedly enhanced resistance to checking. The surface reactive compositions are formulated to have a solids content comparable to wash coat and sealer coat compositions specified in typical commercial furniture finishing schedules. The present surface reactive compositions comprise nitrocellulose, an organic polyfunctional isocyanate, preferably an aliphatic diisocyanate, and an organotin catalyst in an aprotic solvent mixture. Preferably the composition further comprises a synthetic resin in a weight ratio of about 1:4 to about 4:1 relative to the nitrocellulose component.

In accordance with this invention a surface reactive composition is used as the first film-forming coating applied to the veneer surface during the finishing process. Following standard finishing schedule procedures, but substituting the present reactive composition for a standard wash coat composition, a veneer surface is wash-coated with a surface-reactive coating composition and thereafter subjected to light sanding. The exposed wood fibers can be subjected to further staining or treatment with pigment glaze prior to applying a sealer coat, preferably itself a surface reactive composition of this invention, to the veneer surface. The surface finish is then completed in accordance with the remaining finishing schedule specifications. Thus, the present veneer finishing system can be substituted into an existing furniture finishing schedule without modification of the end steps of the process, i.e., the application of top coats and the rubbing and polishing operations, steps which are important to production of consistent finishes characteristic of the specified finishing schedule.

DETAILED DESCRIPTION OF THE INVENTION

The present invention is based on my discovery that surface reactive polyisocyanates can be used in combination with polyhydroxy functional polymers and isocyanate reaction catalyzing organotin compounds in low solids (less than 35%), film-forming formulations as a substitute for standard wash coat and/or sealer coat compositions in furniture finishing schedules to provide veneer finishes with markedly enhanced resistance to checking. The substitute wash coat formulation comprises about 2 to about 14% by weight of an organic polyfunctional isocyanate, about 5 to about 20 weight percent by weight of a polyhydroxy functional polymer, an organotin compound in an amount effective to catalyze reaction of the polyfunctional isocyanate, and about 65 to about 85% by weight aprotic organic solvent. Most preferably, the surface reactive composition further comprises about 5 to about 15 weight percent of a synthetic resin, preferably an alkyd resin, provided that the solids content of the reactive coating composition is less than about 35 weight percent.

Polyhydroxy functional polymers suitable for use in the present invention include cellulose esters, for example, nitrocellulose, cellulose acetate, cellulose butyrate and the like; cellulose ethers such as methylcellulose, ethylcellulose, hydroxyethylcellulose and the like; acrylic resins formed utilizing hydroxyalkyl esters of acrylic acid, polyvinyl alcohols, hydroxy terminated polyethers and polyesters and like polyhydroxy functional polymers. Preferred polyhydroxy functional polymers for use in accordance with this invention are cellulose esters, most preferably nitrocellulose.

The polyisocyanate component of the wash coat/sealer coat formulations in accordance with this invention are those recognized in the art for use in manufacture of polyurethane fibers, elastomers and foams. Thus suitable polyisocyanates include aromatic polyisocyanates, for example, toluene diisocyanate, 4,4'-diphenylmethane diisocyanate, p-phenylene diisocyanate, and napthylene-1,5-diisocyanate, or more preferably, aliphatic polyisocyanates such as $C_2$-$C_8$ alkylene diisocyanates, for example, hexamethylene diisocyanate. Aliphatic isocyanates are preferred, even though they are somewhat less reactive than the aromatic isocyanates, because systems utilizing aliphatic polyisocyanates have less tendency to yellow over time with exposure to light.

The surface reactive compositions in accordance with this invention include an organotin compound in an amount effective to catalyze the reaction of isocyanates with available hydroxyl groups. The exact nature of the organotin compound is not critical, provided that it is dispersible, or most preferably soluble, in the aprotic organic solvent vehicle for the surface reactive composition, and that it contains tin in a catalytically effective form. Suitable tin catalysts include tetra-($C_1$-$C_8$-alkyl) tin, di($C_1$-$C_8$ alkyl) tin di($C_1$-$C_{18}$ alkanoates) for example, dibutyltin dilaurate and dibutyltin diacetate; and di(phenyl or benzyl)tin dihalides or di(phenyl or benzyl)tin di($C_1$-$C_{18}$ alkanoates), for example, dibenzyltin dichloride, diphenyltin dichloride, dibenzyltin diacetate, and like organotin compounds. A preferred organotin catalyst for use in the present invention is dibutyltin dilaurate.

In most preferred embodiments of this invention the surface reactive compositions prepared and used in accordance with this invention are co-catalyzed with an aprotic-organic-solvent-soluble zinc compound, for example zinc salts of $C_1$-$C_{18}$ alkanoic acids or organic sulfonic acids. Zinc salt co-catalysts help promote isocyanate reactivity and to reduce discoloration of the applied coating. Preferred among the zinc co-catalysts for use in the present invention are zinc $C_1$-$C_{10}$ alkanoates, and most preferred is zinc octoate.

The organic aprotic solvent vehicle for the present compositions include those solvents commonly employed in solvent-based coating compositions and include mono- or di-($C_1$-$C_4$ alkyl) aromatic hydrocarbons, di($C_1$-$C_4$ alkyl) or aryl $C_1$-$C_4$ alkyl ketones, $C_1$-$C_4$ esters of $C_2$-$C_8$ mono- or di-carboxylic acids and petroleum distillates. Typically the solvent medium comprises a mixture of aprotic organic solvents derived principally from commercially supplied solvent solutions of the respective composition components. The nature of the aprotic organic solvent medium is not critical, except that the composition components should be soluble and/or dispersible in the solvent medium, and the solvent components should have a boiling point that allows reasonable drying/evaporation times following application of the surface reactive composition to the wood surface. Exemplary of the aprotic solvents used in accordance with this invention are toluene, xylene, methylisobutyl ketone, diisobutyl ketone, dibutyl phthalate, ethyl acetate, butyl acetate, and the like.

Preferably, the surface reactive compositions for use in accordance with the present invention include, in addition to the above mentioned components, about 5 to about 15 weight percent of a synthetic resin component selected from the group consisting of alkyd, acrylic, epoxy and polyester resins. The nature of the synthetic resin is not critical, however, surface reactive compositions comprising alkyd resins have been noted to perform especially well in the present improved veneer finishing process.

The surface reactive finishing compositions in accordance with this invention are typically formulated to contain other functional excipients to facilitate handling and to optimize situation-dependent functionality. Coating composition excipients and the functional characteristics they impart to solvent-based coatings are well known in the art. Thus, for example, low concentrations of silicone can be used as a bubble breaker and flow agent. Other excipient components can be added with view of facilitating subsequent finishing operations. For example, sanding agents such as micronized polyethylene wax or coated silicon dioxide powder can be added to facilitate subsequent sanding operations. Another optional, but preferred functional additive for the present surface reactive compositions is diacetone alcohol. It is typically used at about 0.5 to about 2 weight percent of the surface reactive composition to impart stability and "bubble breaking" functionality—it acts as a surfactant in the system.

The surface reactive finishing composition in accordance with the present invention thus comprises about 5 to about 20 weight percent, more preferably 7 to about 15 weight percent nitrocellulose, about 2 to about 14 weight percent, more preferably about 4 to about 8 percent by weight of an organic polyfunctional isocyanate, an organotin compound in an amount effective to catalyze reaction of the polyfunctional isocyanate, and about 65 to about 85 percent by weight, more preferably about 70 to about 80 percent by weight of organic aprotic solvent. The organotin catalyst is typically effective at concentrations as low as 0.01 weight percent of the composition. Similarly, when a zinc co-catalyst compound is employed, it is effective at concentrations as low as 0.01 weight percent of the composition. Those catalysts can, however, be used at higher concentrations if processing conditions are found to require higher catalytic activities.

In preferred embodiments of this invention, the surface reactive composition further comprises from about 5 to about 15 percent by weight, more preferably about 7 to about 12 percent by weight, of a synthetic resin. In such preferred finishing compositions, the weight ratio of resin to nitrocellulose (or other polyhydroxy functional polymer) is about 1:4 to about 4:1 and the combined weight percentage of nitrocellulose, synthetic resin and polyfunctional isocyanate is less than 35 percent, most preferably between about 20 and about 30 percent by weight of the surface reactive composition.

The surface reactive compositions of this invention are typically prepared in a two step process. All composition ingredients except for the organic polyfunctional isocyanate are typically combined as an ingredient premix. The isocyanate component is then blended with the ingredient premix immediately before use of the resulting surface reactive finishing composition.

The present surface reactive finishing composition can be utilized as the wash coat and/or sealer coat in place of existing wash coat/sealer coat formulations to impart to the coated veneer surface a much enhanced resistance to checking. Typical wood finishing schedules include multiple finishing step operations, including in sequence: multiple staining steps; application of a wash coat to ready the surface for finish sanding, application of fillers to fill the pores and provide a firm base for the after-applied coatings; additional staining and overshading; application of a sealer coat which further fills and evens out the pores; additional sanding; application of additional pigment glaze and/or padding stains; application of one or more top coats typically with a sanding operation between each coat; and finally hand rubbing and hand polishing. In accordance with the present invention, the surface reactive composition is substituted for the standard wash coat or sealer coat compositions. The reactive composition comprises from about 2 to about 14 percent by weight of an organic polyfunctional isocyanate, about 5 to about 20 weight percent of a polyhydroxy functional polymer, preferably nitrocellulose, and an organotin compound in an amount effective to catalyze the reaction of the polyfunctional isocyanate in about 65 to about 85 weight percent aprotic organic solvent. Preferably the composition further comprises from about 5 to about 15 weight percent of a synthetic resin, most preferably an alkyd resin, and in an amount such that the surface reactive composition has a solids content of less than 35 weight percent.

The present invention can be used advantageously with but minor modification of existing finishing schedules. The present surface reactive composition is simply substituted for schedule-specified wash coat and sealer coat compositions. Preferably the present surface reactive compositions are used as both the wash coat and sealer coat.

The thickness of the modified urethane coating formed utilizing the present surface reactive finishing composition varies depending on the solids content, and thus the viscosity, of the applied composition. Typically the coatings range from about 10 microns to about 35 microns, usually about 25 microns. Of course, intervening sanding operations reduce film thickness. Thus, for example a surface wash-coated with a reactive composition of this invention at a solids content of about 20 percent provides a coating about 15 to about 35 microns thick. With light sanding, that coating is reduced in thickness to the extent that wood fibers in the veneer surface are exposed so that they can be stained prior to application of a sealer coat. It has been found that the surface reactive coatings in accordance with this invention are more compatible with stained veneer surfaces when those surfaces have been prepared with staining compositions utilizing reacted vehicles. Unreacted vehicles have been noted to result in adhesion failure signaled by a whitening of the applied coating composition.

The following non-limiting examples are provided to further illustrate the surface reactive finishing formulations of the present invention and their use to provide check resistant finishes on veneer surfaces.

EXAMPLE 1

A surface reactive wash coat/sealer coat composition was formulated by first preparing a coating pre-mix by combining the ingredients listed in Table 1 in the specified weight proportions, and thereafter combining that pre-mix in a ratio of 9:1 with an aliphatic isocyanate (Mobay Desmodur N, 60% solids in butyl acetate) at room temperature.

TABLE 1

| Ingredient | % per Weight | % Solid | % per Solid |
|---|---|---|---|
| Castor Alkyd (Phthalic Anhydride reacted Castor Oil), 70% Solids in Xylene/Toluene (Eternal 3401-XT-70) | 13.4 | 9.4 | 44.6 |
| Nitrocellulose, 30% Solids in Combination of Toluene, Methyl IsoButyl Ketone, and DiButyl Phthalate | 26.9 | 8.04 | 38.3 |
| GE Silicone, 1% in n-Butyl Acetate (1% SF69 Solution) | 0.96 | 0.01 | 0.03 |
| Micronized Polyethylene Wax (Acumist B-6 PE) | 0.49 | 0.49 | 2.4 |
| Coated Silicon Dioxide Power (OK412) | 3.1 | 3.1 | 14.8 |
| Methyl IsoButyl Ketone | 29.4 | 0.00 | 0.00 |
| Toluene | 25.1 | 0.00 | 0.00 |
| DiButyl Tin DiLaurate, 1% in Toluene | 0.57 | 0.00 | 0.01 |
| Zinc Octoate | 0.01 | 0.00 | 0.01 |

The resulting surface reactive finishing composition was substituted for a standard wash coat/sealer coat formulation used in a cherry veneer finishing system. Cherry veneer was first filled and stained with a non-grain raising prestain and a durostain. The surface reactive composition was then applied by spraying the veneer surface to form a full wet coat of the composition. After allowing the wash coat to dry for 15 minutes the veneer surface was sanded. A pigment glaze in a reacted linseed oil vehicle was applied. The surface reactive composition was then spray-applied as a sealer coat, cured for 15 minutes at about 40° C. and then sanded. The veneer surface was then pad stained per a color sample, and top coats were applied per normal finishing schedule procedures. The veneer surface was then rubbed and polished using standard techniques to provide a finished veneer surface which exhibited exceptional resistance to check formation.

EXAMPLE

The same procedure was followed as in Example 1 except the premix formulation was prepared using the ingredients as shown in Table 2.

TABLE 2

| Ingredient | % per Weight | % Solid | % per Solid |
|---|---|---|---|
| Castor Alkyd, 70% Solids in Xylene/Toluene (Eternal 3401-XT-70) | 15.8 | 11.1 | 53.7 |
| Nitrocellulose, 30% Solids in Toluene/Methyl IsoButyl Ketone/ DiButyl Phthalate | 31.9 | 9.5 | 46.2 |
| GE Silicone, 1% in n-Butyl Acetate (1% SF69 Solution) | 1.7 | 0.01 | 0.06 |
| DiButyl Tin DiLaurate, 1% in Toluene | 1.35 | 0.00 | 0.00 |
| Zinc Octoate | 0.07 | 0.01 | 0.02 |
| Di Acetone Alcohol | 1.01 | 0.00 | 0.00 |
| Xylene | 12.0 | 0.00 | 0.00 |
| Di Iso/Butyl Ketone | 1.7 | 0.00 | 0.00 |
| Methyl IsoButyl Ketone | 34.4 | 0.00 | 0.00 |

The surface reactive composition, prepared by combining 9 parts per weight of the premix composition with 1 part per weight of 60% solids solution of an aliphatic isocyanate in n-butyl acetate, is used as a wash coat and sealer coat in an otherwise standard veneer finishing schedule to provide a finished veneer panel with enhanced resistance to veneer checking.

I claim:

1. A surface reactive wood finishing composition comprising about 5 to about 20% by weight of nitrocellulose, about 2 to about 14% by weight of a organic polyfunctional isocyanate, an organotin compound in an amount effective to catalyze reaction of said polyfunctional isocyanate and about 65 to 85% by weight of organic aprotic solvent.

2. The wood finishing composition of claim 1 further comprising about 5 to about 15% by weight of a synthetic resin selected from the group consisting of alkyd, acrylic, epoxy and polyester resins provided that the combined weight percentage of nitrocellulose, the synthetic resin and polyfunctional isocyanate is less than 35%.

3. The composition of claim 2 where in the synthetic resin is an alkyd resin.

4. The composition of claim 1 further comprising about 0.5 to about 2 weight percent of diacetone alcohol.

5. The composition of claim 1 further comprising silicone in an amount effective to reduce bubble formation in the finishing composition.

6. The composition of claim 1 wherein the organic aprotic solvent comprises toluene or xylene in combination with a dialkyl ketone.

7. The composition of claim 1 further comprising a solvent soluble zinc salt in an amount effective to enhance the catalyzed reaction of the organic isocyanate.

8. The composition of claim 1 further comprising a sanding agent selected from the group consisting of micronized polyethylene wax and silicon dioxide.

9. In a process for finishing a wood veneer surface comprising the steps of applying a wash coat composition and/or a sealer coat composition, and at least one top coat composition, the improvement which comprises utilizing a surface reactive finishing composition for at least one of the wash coat and sealer coat compositions, said surface reactive finishing composition comprising about 5 to about 20 weight percent nitrocellulose, about 2 to about 14 weight percent of an organic polyfunctional isocyanate, an organotin compound in an amount effective to catalyze reaction of said polyfunctional isocyanate, and about 65 to about 85 weight percent of organic aprotic solvent.

10. The process of claim 9 wherein the surface reactive composition is utilized for both the wash coat composition and the sealer coat composition.

11. The process of claim 9 wherein a stain is applied to the surface after application of the wash coat and before application of the sealer coat.

12. The process of claim 9 wherein the polyfunctional isocyanate is an aliphatic isocyanate.

13. The process of claim 9 wherein the surface reactive composition is about 20 to 30 weight percent solids.

14. The process of claim 9 wherein the surface reactive composition further comprises about 5 to about 15% by weight of a synthetic resin selected from the group consisting of alkyd, acrylic, epoxy and polyester resins.

15. The process of claim 14 wherein a stain is applied to the surface after application of the wash coat and before application of the top coat.

16. The process of claim 14 wherein the synthetic resin is an alkyd or polyester resin.

17. The process of claim 14 wherein the surface reactive composition is utilized for both the wash coat composition and the sealer coat composition.

18. The process of claim 9 wherein the surface reactive composition further comprises about 0.5 to about 2 weight percent of diacetone alcohol.

19. The process of claim 9 wherein 25 the surface reactive composition further comprises a solvent soluble zinc salt.

20. The process of claim 10 wherein the top coat is a nitrocellulose lacquer.

21. The process of claim 10 further comprising the steps of sanding the wash-coated veneer surface to reduce the thickness cross-section of the wash-coat and to expose at least a portion of the veneer surface and applying a stain to the exposed portions of the veneer surface.

22. A surface reactive wood finishing composition comprising about 5 to about 20 weight percent of nitrocellulose, about 5 to about 15 weight percent of an alkyd resin, about 2 to about 14 percent by weight of an organic polyfunctional isocyanate, an organotin compound in an amount effective to catalyze reaction of said polyfunction isocyanate and about 65% to about 85% by weight of organic aprotic solvent.

23. The composition of claim 22 further comprising about 0.5 to about 2% by weight diacetone alcohol.

24. The composition of claim 22 further comprising a solvent soluble zinc salt.

25. In a commercial veneer finishing process for furniture manufacture comprising the steps of applying a wash coat and/or sealer coat composition and applying at least one top coat composition, the improvement which comprises applying a surface reactive composition as the wash coat or sealer coat, said surface reactive composition comprising about 2 to about 14 percent by weight of an organic polyfunctional isocyanate, about 5 to about 20 percent by weight of a polyhydroxy functional polymer, an organotin compound in an amount effect to catalyze reaction of said polyfunctional isocyanate and about 65 to about 85% by weight aprotic organic solvent.

26. The process of claim 25 wherein the polyhydroxy functional polymer is nitrocellulose and the organotin compound is dibutyltin dilaurate.

27. The process of claim 25 wherein the organic polyfunctional isocyanate is an aliphatic diisocyanate.

28. The process of claim 25 wherein the surface reactive composition further comprises about 5 to about 15 weight percent of an alkyd resin and the surface reactive composition has a solids content of less than 35 weight percent.

* * * * *

UNITED STATES PATENT AND TRADEMARK OFFICE
CERTIFICATE OF CORRECTION

PATENT NO. : 5,242,490
DATED : September 7, 1993
INVENTOR(S) : James M. Maner

It is certified that error appears in the above-identified patent and that said Letters Patent is hereby corrected as shown below:

Title page,
Item [56], References Cited, FOREIGN PATENT DOCUMENTS,
delete "54-038161" and replace with -- 79-038161 --.

Column 8,
Line 12, after "wherein" and before "the" delete "25".

Signed and Sealed this

Sixteenth Day of May, 2006

JON W. DUDAS
*Director of the United States Patent and Trademark Office*